Feb. 20, 1945.   A. L. DELVAUX, SR   2,370,017
LATHE CHUCK CENTERING DEVICE
Filed Jan. 17, 1944
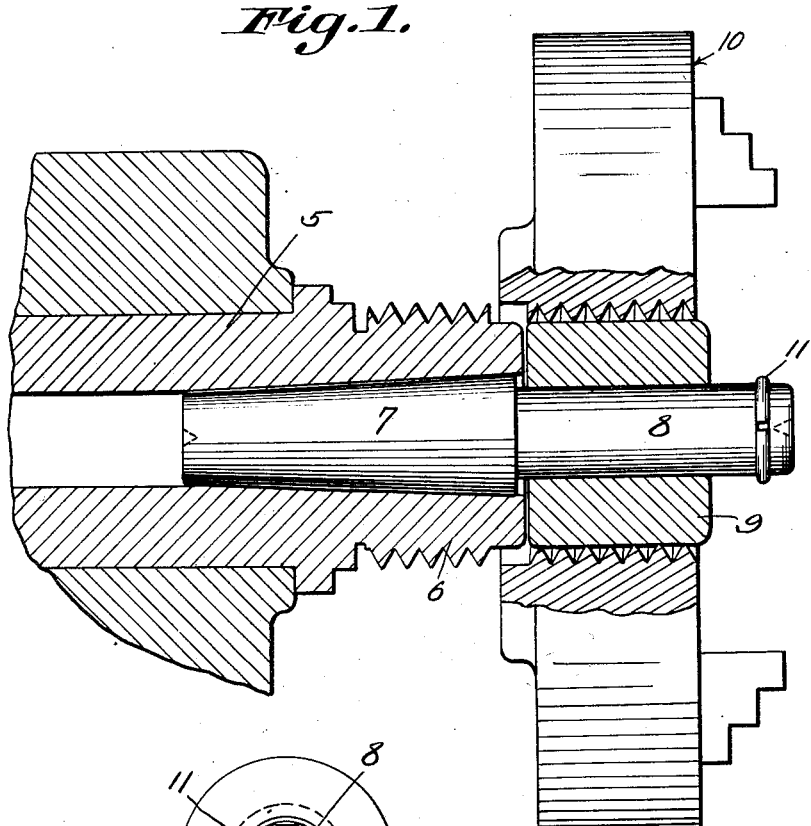
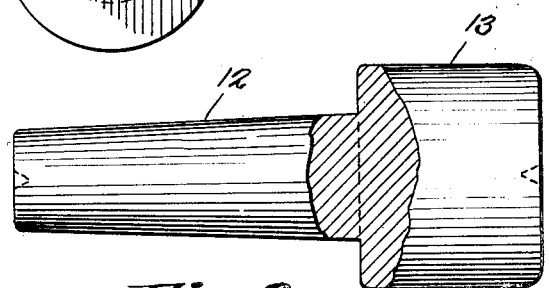
A. L. Delvaux, Sr
INVENTOR.
BY
ATTORNEYS.

Patented Feb. 20, 1945

2,370,017

UNITED STATES PATENT OFFICE 2,370,017

LATHE CHUCK CENTERING DEVICE

Arthur L. Delvaux, Sr., Los Angeles, Calif.

Application January 17, 1944, Serial No. 518,626

1 Claim. (Cl. 29—271)

This invention relates to a device designed for use in mounting and dismounting lathe chucks, the primary object of the invention being to provide a device of this character which will properly align the threads of a chuck, with the threads of the lathe spindle nose, on which the chuck is being positioned, to the end that the chuck may be readily and easily mounted.

Another object of the invention is to provide a device of this character which will constitute a temporary support for the chuck, while it is being mounted or dismounted, thereby eliminating any possibility of the chuck slipping or dropping from the hands of the person positioning the same, onto the table of the lathe to damage the lathe table.

Still another object of the invention is to provide a rotatable spool on which the chuck is positioned as the chuck is being fed to the threads of the lathe spindle, preventing wear on the threads of the chuck, during the positioning operation.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing:

Fig. 1 is a longitudinal sectional view through a lathe spindle, illustrating a centering device, constructed in accordance with the invention, as positioned in the lathe spindle, a chuck being shown as positioned on the device for transfer to the lathe spindle nose.

Fig. 2 is an end elevational view of the device.

Fig. 3 is an elevational view of a modified form of the invention.

Referring to the drawing in detail, the reference character 5 designates a lathe spindle, and the reference character 6 designates the threaded nose thereof. These lathe spindles are formed with tapered bores, as shown by Fig. 1 of the drawing, and the centering or aligning device, forming the subject matter of the present invention, is designed to fit within the tapered bore, as clearly shown by Fig. 1.

The reference character 7 designates the tapered end of the device which is forced into the tapered bore, the portion 8 of the device providing a shaft on which the spool 9 is mounted, the shaft 8 being shown as being of a length to extend an appreciable distance beyond the spindle nose.

The spool is of a diameter equal to the diameter of the threaded nose of the spindle, at the base of the threads, so that a chuck positioned on the spool, may be fed directly from the spool onto the lathe spindle nose.

In the present showing, the lathe chuck to be positioned, is indicated by the reference character 10, and it will be seen that the chuck, when in the position as shown by Fig. 1, may be readily slid directly onto the nose to properly align the threads of the chuck with the threads of the lathe spindle, without danger of binding or distorting the threads of either the chuck or spindle.

Adjacent to the outer end of the shaft portion 8, is an annular groove in which the split spring ring 11 is positioned, the ring being of the type which is snapped into the groove and held by frictional contact with the wall of the groove. This ring acts as a stop to prevent the spool 9 from being pulled from the shaft 8, when a chuck is being removed.

In the form of the invention as shown by Fig. 3 of the drawing, the device is made in a single piece, and includes a tapered section 12 adapted to be driven into the tapered bore in the lathe spindle, as shown in Fig. 1. In this form of the invention, the enlarged portion 13 is of a diameter equal with the diameter of the lathe spindle nose, at the base of the threads, so that when the device is positioned, and a chuck is moved thereunto, the chuck, when slid forwardly towards the lathe spindle, will pass onto the nose of the lathe spindle, the threads of the chuck being in direct alignment with the threads of the lathe spindle, so that the chuck may be positioned with facility.

While I have described the device as a temporary support for a chuck while it is being positioned, it is to be understood that the device also constitutes effective means for supporting the chuck, which is sometimes exceptionally heavy, to insure against the chuck dropping onto the lathe table, when it is being removed, to damage the lathe table.

From the foregoing it is believed that the use and operation of the device will be clearly obvious, and that further description as to the use of the invention is unnecessary.

What is claimed is:

In a device of the class described, a body portion including a tapered end section and a shaft extending longitudinally from one end of the tapered end section, said tapered end section adapted to be positioned in the bore in the end of a lathe spindle, said shaft having an annular groove formed adjacent to its outer end, and a shoulder formed adjacent to its inner end, a spool mounted for sliding movement on the shaft, a spring ring member adapted to fit within the groove and secure the spool against displacement, said spool being of a diameter equal to the diameter of the lathe spindle with which the device is used, and said spool providing a support for a lathe chuck whereby said lathe chuck will be fed directly to the threads of the lathe spindle, aligning the threads of the spindle and chuck.

ARTHUR L. DELVAUX, Sr.